US008991360B2

(12) United States Patent
Hackett

(10) Patent No.: US 8,991,360 B2
(45) Date of Patent: Mar. 31, 2015

(54) COAXIAL QUILL ASSEMBLY RETAINER AND COMMON RAIL FUEL SYSTEM USING SAME

(75) Inventor: David Elliot Hackett, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 470 days.

(21) Appl. No.: 13/534,343

(22) Filed: Jun. 27, 2012

(65) Prior Publication Data

US 2014/0000563 A1 Jan. 2, 2014

(51) Int. Cl.
*F16L 39/04* (2006.01)
*F02M 55/02* (2006.01)
*F02M 43/00* (2006.01)

(52) U.S. Cl.
CPC ............... *F02M 43/00* (2013.01); *F02M 55/02* (2013.01); *F02M 55/025* (2013.01); *Y10T 29/494* (2013.01)
USPC ........ 123/468; 123/469; 123/470; 285/121.1; 285/123.1; 285/123.3

(58) Field of Classification Search
USPC ............... 123/456, 468, 469, 470; 285/121.1, 285/123.1, 123.4, 123.5, 123.6, 123.13
See application file for complete search history.

(56) References Cited

U.S. PATENT DOCUMENTS 5,308,239 A * 5/1994 Bazarian et al. ................ 431/10
5,423,178 A * 6/1995 Mains ............................ 60/776
5,617,828 A 4/1997 Kuegel et al.
5,775,303 A * 7/1998 Sweetland et al. ............ 123/470
6,092,363 A 7/2000 Ryan
6,199,539 B1 * 3/2001 Pearlman et al. ............. 123/470
6,234,413 B1 5/2001 Greaney
6,256,995 B1 * 7/2001 Sampath et al. ................ 60/740
6,276,141 B1 * 8/2001 Pelletier .......................... 60/740
6,431,150 B1 8/2002 Pearlman et al.
6,604,509 B1 8/2003 Hegner
6,840,225 B2 1/2005 Sandoval
7,043,922 B2 * 5/2006 Thompson et al. ............. 60/772
7,624,788 B2 * 12/2009 Brown et al. ................... 165/83
7,958,870 B2 6/2011 Bonfigli et al.
8,272,368 B2 * 9/2012 Wickstone .................... 123/468
8,522,752 B2 * 9/2013 Kim et al. ..................... 123/468
8,695,572 B2 * 4/2014 Guido et al. .................. 123/468
2004/0006989 A1 * 1/2004 Stuttaford et al. .............. 60/776
2004/0006991 A1 * 1/2004 Stuttaford et al. .............. 60/776
2004/0134553 A1 * 7/2004 Ichimura et al. .............. 138/114
2010/0096037 A1 * 4/2010 Lee et al. ...................... 138/114
2012/0012083 A1 1/2012 Tower et al.
2012/0055448 A1 3/2012 Kim et al.

* cited by examiner

*Primary Examiner* — Thomas Moulis
(74) *Attorney, Agent, or Firm* — Liell & McNeil Attorneys, PC

(57) ABSTRACT

A coaxial quill assembly is used for supplying gaseous and liquid fuels from separate common rails to individual fuel injectors of a compression ignition engine. Each coaxial quill assembly includes a matched pair of an outer quill and an inner quill that are matched based upon a fuel system dimensional specification that causes both the inner and outer quills to sealingly engage a common conical seat of a fuel injector. During pre-installation handling, the matched pair of inner and outer quills are retained together with a retainer.

17 Claims, 3 Drawing Sheets

$S = D_2 - D_1 = a + b + d$

COAXIAL QUILL ASSEMBLY RETAINER AND COMMON RAIL FUEL SYSTEM USING SAME

TECHNICAL FIELD

The present disclosure relates generally to dual fuel common rail systems, and more particularly to a coaxial quill assembly that includes a matched pair of outer and inner quills kept together during pre-installation handling with a retainer.

BACKGROUND

Co-owned U.S. Patent application publication 2012/0055448 shows a co-axial quill assembly for a dual fuel common rail system in which inner and outer quills sealingly engage a common conical seat on individual fuel injectors. That references teaches the utilization of separate loading devices to ensure that the inner and outer quills sealingly engage the fuel injector despite dimensional tolerance variations that would be expected during the manufacture of the individual inner and outer quills, fuel injector and other engine components. While such a strategy may permit any outer quill to be matched with any inner quill at the time the fuel system is assembled to an engine, the separate loading strategy for each quill may be cumbersome and occupy more space than desirable in and around the engine.

The present disclosure is directed toward one or more of the problems set forth above.

SUMMARY

In one aspect, a coaxial quill assembly includes an outer quill with a first dimension along a centerline. An inner quill is positioned inside the outer quill and has a second dimension along the centerline. The outer quill and the inner quill are a matched pair such that the first dimension and the second dimension have a difference corresponding to a fuel system dimensional specification. The inner quill defines a first fuel passage, and a second fuel passage is defined by and between the inner quill and the outer quill. A retainer is positioned in, but not obstructing, the second fuel passage in frictional contact with an interior surface of the outer quill and an exterior surface of the inner quill. The retainer permits movement of the first quill relative to the second quill along the centerline with an application of an adjustment force, but resists separation of the first quill from the second quill absent a forced disassembly.

In another aspect, a dual fuel common rail fuel system includes a first common rail, a second common rail, and a plurality of fuel injectors that each define a first fuel inlet and a second fuel inlet that open through a common conical seat. A plurality of quill assemblies each defines first and second fuel passages that fluidly connect the first common rail and the second common rail, respectively, to an individual one of the fuel injectors. Each of the quill assemblies includes matched inner and outer quills that are out of contact with each other but retained together during pre-installation handling by a retainer positioned in the second fuel passage. The match is based on a first dimension of the outer quill and a second dimension of the inner quill having a difference corresponding to a fuel system dimensional specification that causes both the inner and outer quills to sealingly engage the common conical seat. The retainer resists separation of the first quill from the second quill absent a forced disassembly during pre-installation handling, but is inert to operation of the fuel system.

In still another aspect, a method of assembling a fuel system includes pre-assembling a plurality of quill assemblies by matching inner and outer quills for each quill assembly. The match is based on a first dimension of the outer quill and a second dimension of the inner quill having a difference corresponding to a fuel system dimensional specification that causes both the inner and outer quills to sealingly engage a common conical seat of one of the fuel injectors. A first common rail and a second common rail are fluidly connected to the plurality of fuel injectors with a plurality of quill assemblies. The matched inner and outer quills are retained together during pre-installation handling with a retainer positioned between the inner and outer quills. The retainers are left in place between their respective inner and outer quills after the rails are fluidly connected to the fuel injectors.

DETAILED DESCRIPTION

Figure 1:
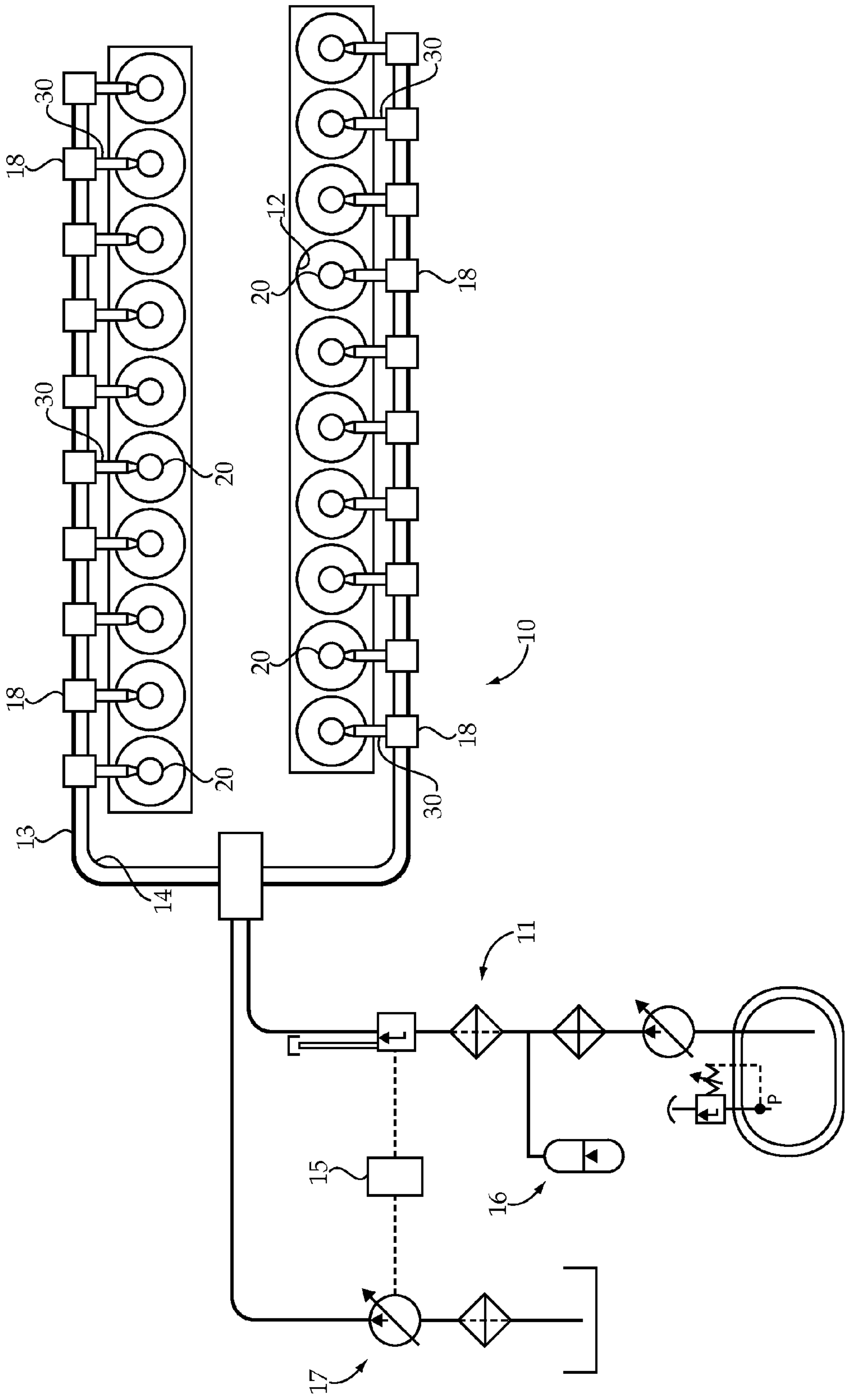
FIG. 1 is a schematic illustration of an engine and dual fuel common rail fuel system according to the present disclosure.
Figure 2:
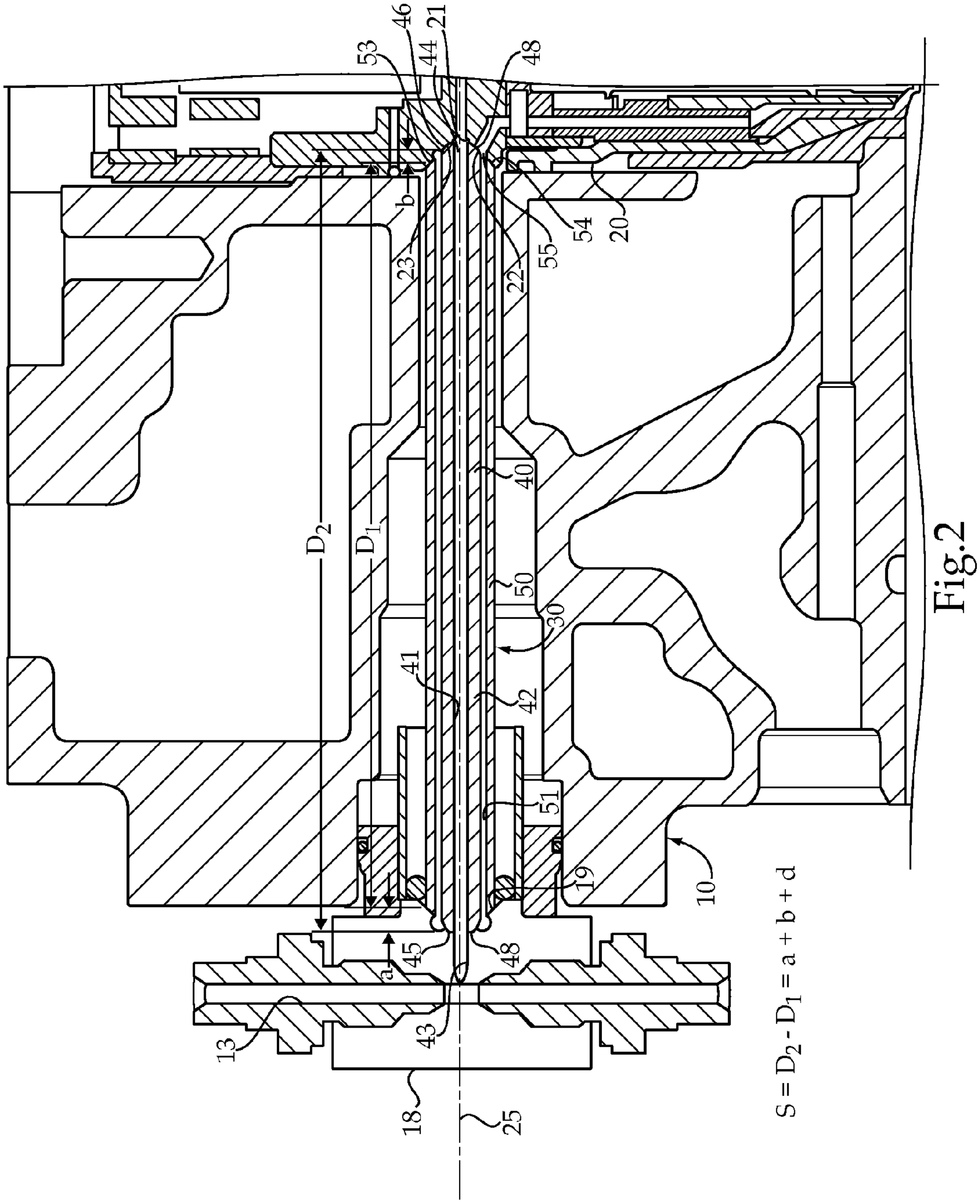
FIG. 2 is a side sectioned view through one of the coaxial quill assemblies shown in FIG. 1.

Referring initially to FIGS. 1 and 2, an engine 10 includes a dual fuel common rail fuel system 11 that includes individual fuel injectors 20 positioned for direct injection into engine cylinders 12. For instance, engine 10 might be a V configuration multi-cylinder compression ignition engine, such as those that might find use in mining operations and other similar applications. Dual fuel common rail fuel system 11 includes a first common rail 13 connected to a liquid fuel supply 17, and a second common rail 14 connected to a gaseous fuel supply 16. In the illustrated embodiment, the pressure in common rails 13 and 14 may be controlled by an electronic controller 15 in a conventional manner. Each of the fuel injectors 20 defines a liquid fuel inlet 21 and a gaseous fuel inlet 22 that open through a common conical seat 23. A plurality of quill assemblies 30 each define a first fuel passage 41 and a second fuel passage 51 that fluidly connect the first common rail 13 and the second common rail 14, respectively, to an individual one of the fuel injectors 20. Each of the quill assemblies 30 include a matched pair of an inner quill 40 and an outer quill 50 that are out of contact with each other but retained together during pre-installation handling by a retainer 60 positioned in the second fuel passage. Each matched pair of an inner quill 40 and outer quill 50 is based upon a first dimension $D_1$ of the outer quill 50 and a second dimension $D_2$ of the inner quill 40 having a difference S corresponding to a fuel system dimensional specification that causes both the inner and outer quills to sealingly engage the common conical seat 23.

The retainer 60 resists separation of the inner quill 40 from its matched outer quill 50 absent a forced disassembly during pre-installation handling. However, after installation, the retainer 60 may be inert to operation of the fuel system 11. Forced disassembly means that the matched quill pair 40, 50 will not accidently separate, such as by being dropped or maybe even mishandled. The forced disassembly requires an intent and maybe a tool(s) to separate one of the inner quill 40 and outer quill 50 from the retainer 60. Being inert to the operation of the fuel system 11 means that fuel flows through or past the retainer 60 without interfering with the flow to the fuel injectors 20.

The inner quill 40 has a spherical end 46 that is in contact with the common conical seat 23 at a gage line 48. In addition, the outer quill 50 includes a spherically shaped end 53 that is also in contact with common conical seat 23 at a gage line 54. The previously identified fuel system dimensional specification that causes the inner and outer quills 40, 50 to sealingly engage the common conical seat 23 may be prescribed by a specific distance "b" along a centerline 25 between gage line 48 and gage line 54.

In the illustrated embodiment, the inner quill 40 has another spherical end 45 that defines an inlet 43 to the first fuel passage 41. As shown in FIG. 2, quill assembly 30 might also include a manifold/clamp 18 that includes a conical seat 19 in contact with spherical end 45 of inner quill 40 at gage line 47.

As stated earlier, the first common rail 13 may contain a liquid fuel, such as distillate diesel fuel, and the second common rail 14 may contain a gaseous fuel, such as natural gas. Nevertheless, those skilled in the art will appreciate that first and second common rails 13 and 14 could include different liquid fuels, or possibly even the same liquid fuels at different pressures without departing from the present disclosure.

Referring more specifically to FIGS. 2-5, each coaxial quill assembly 30 includes an outer quill 50 with a first dimension $D_1$ along centerline 25. An inner quill 40 is positioned inside the outer quill 50 and has a second dimension $D_2$ along centerline 25. As described earlier, the outer quill 50 and the inner quill 40 are a matched pair such that the first dimension $D_1$ and the second dimension $D_2$ have a difference S corresponding to a fuel system dimensional specification. The inner quill 40 defines a first fuel passage 41. A second fuel passage 51 is defined by and between the inner quill 40 and the outer quill 50. A retainer 60 is positioned in, but not obstructing the second fuel passage 51 in frictional contact with an interior surface 52 of outer quill 50 and an exterior surface 42 of inner quill 40. The retainer 60 permits relative movement of the first quill 40 relative to the second quill 50 along centerline 25 with an application of an adjustment force, such as what might occur during installation in a fuel system 11. However, the retainer 60 resists separation of the first quill 40 from its matched second quill 50 absent a forced disassembly.

Depending upon the structure of coaxial quill assembly 30, the difference S may include a distance "b" along centerline 25 between a first gage line 54 of the outer quill 50 and a second gage line 48 of the inner quill 40. The outer quill 50 may include a spherically shaped end 53 that includes gage line 54, and inner quill 40 may also have a spherically shaped end 46 that includes the gage line 48. The dimension $D_2$, of the example embodiment shown corresponds to the distance between gage line 48 and gage line 47 on inner quill 40 along centerline 25. The first dimension $D_1$ may correspond to a distance along centerline 25 between a first end of outer quill 50 and the gage line 54 at outlet 55. In this specific embodiment, the first dimension $D_1$ is less than a length $L_1$ of the outer quill 50 along centerline 25. In addition in the specific embodiment, the second dimension $D_2$ is less than a length $L_2$ of the inner quill 40 along centerline 25.

The inner quill 40 may have spherical shaped ends 45 and 46 that define an inlet 43 and an outlet 44, respectively, to the first fuel passage 41. The outer quill 50 also has a spherically shaped end 53 that defines an outlet 55 from the second fuel passage 51.

The dimension "a" in FIG. 2 may correspond to a distance along centerline 25 between the end of outer quill 50 and the gage line 47 of inner quill 40. Thus, these dimensions for the specific embodiment yield the equations that $S=D_2-D_1$ which equals a+b. In one specific embodiment, manifold/clamp 18 and its conical seat 19 might also be a common conical seat such that small dimension "a" represents a distance between gage line 47 of inner quill 40 and another gage line on the proximal end of outer quill 50 that also seats on common conical seat 19. Thus, dimension "a" and dimension "b" may be characterized as gage line differences, depending upon the specific embodiment and structure, especially at the proximal end near manifold/clamp 18. Those skilled in the art will appreciate that, because the relative spring rates of the inner and outer quills 40, 50 they may require different load levels to ensure proper sealing at common conical seat 23. If so, there might also need to be a differential length (d) that is needed to achieve the appropriate loading. Therefore, the equations might be expressed as $S=D_2-D_1$ which equals a+b+d. The differential length "d" may be positive or negative or zero, depending upon the specific design, quill materials and geometries. Thus, depending upon the specific design, "a" "b" and "d" may all be part of the fuel system dimensional specification discussed above.

Figure 3:
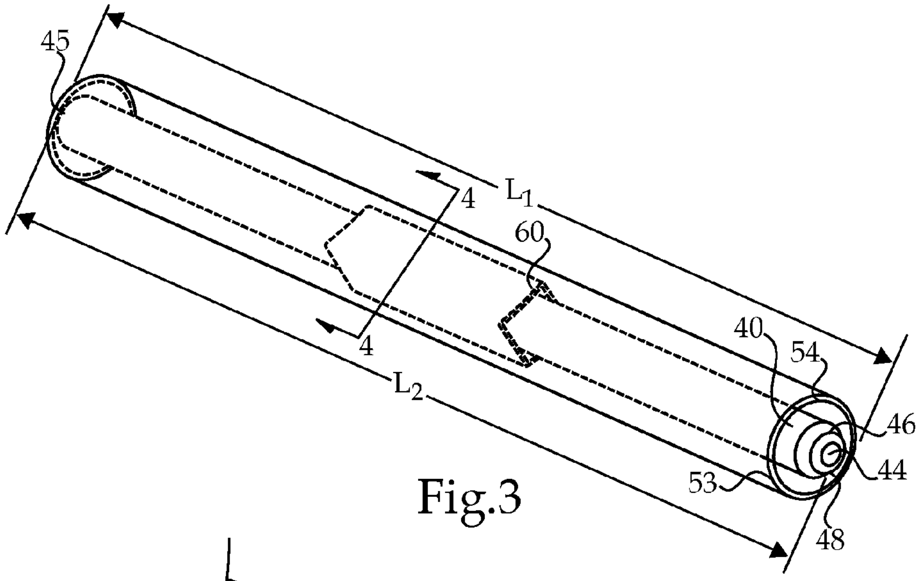
FIG. 3 is a perspective see through image of the coaxial quill assembly of FIG. 2.
Figure 4:
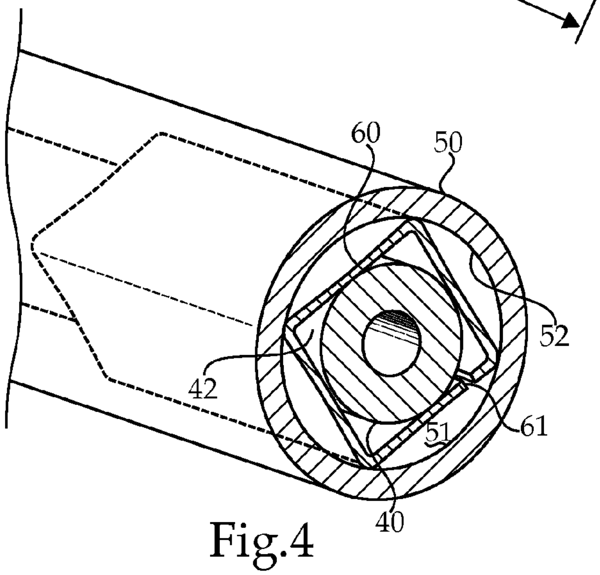
FIG. 4 is a perspective sectioned view of the coaxial quill assembly of FIG. 3 as viewed along section lines 4-4.
Figure 5:
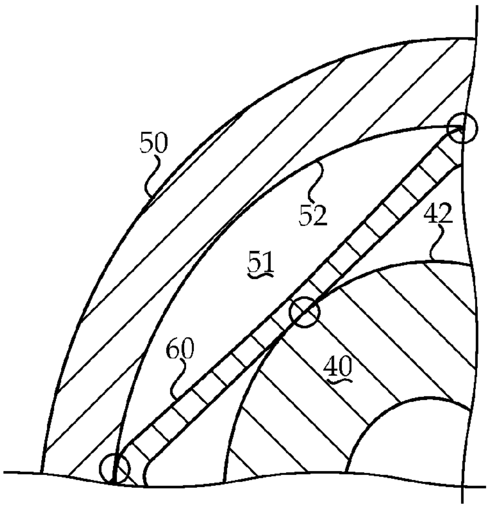
FIG. 5 is a partial end sectioned view through the coaxial quill assembly of FIG. 3.

Referring specifically to FIGS. 3-5, one example embodiment of retainer 60 is shown as a piece of spring steel that is elastically deformed to be positioned between inner quill 40 and outer quill 50. This deformation may produce interference frictional contact at the circled contact points shown in FIG. 5. In one specific example, the retainer 60 may have an open shape 61, such as the incomplete square shape as shown in FIGS. 3-5.

Because achieving sealing contact of both inner quill 40 and outer quill 50 at common conical seat 23 of fuel injector 20 is sensitive to the geometry at the contact location(s), one might expect at least one outer quill 50 of at least one quill assembly 30 would not be a match for an inner quill 40 of at least one other quill assembly 30 in a typical engine 10. Thus, although the inner quills 40 and the outer quills 50 in the fuel system 11 may have slightly different dimensions from one another, the matched pairs all have a common fuel system dimensional specification. The retainers 60 of each quill assembly 30 may comprise an identical piece, such as spring steel, that is elastically deformed between the inner quill 40 and the outer quill 50. As stated earlier, in the specific embodiment illustrated, the retainer 60 is illustrated, for example, as each being an identical piece of spring steel that defines an open square shape 61 around centerline 25.

INDUSTRIAL APPLICABILITY

The present disclosure relates generally to fuel systems which need to bring two fuels that differ in at least one of identification, pressure and liquid or gaseous state from each other. The present disclosure finds specific application to fuel systems that supply liquid compression ignition fuel and natural gas fuel for combustion in an engine 10. The present disclosure is specifically applicable to supplying fuels to fuel injectors 20 through an individual opening, for instance, in the engine head of engine 10. Finally, the present disclosure finds specific application to a strategy for matching inner and outer quills 40, 50 and retaining them together with a retainer 60 during pre-installation handling.

In one aspect, a method of assembling a fuel system 11 includes pre-assembling a plurality of quill assemblies 30. Each preassembled quill assembly 30 includes a matching pair of an inner quill 40 with an outer quill 50 that is based on a first dimension $D_1$ of the outer quill 50 and a second dimension $D_2$ of the inner quill 40 having a difference S corresponding to a fuel system dimensional specification that causes both the inner and outer quills 40, 50 to sealingly engage a common conical seat 23 of one of the fuel injectors 20 in the fuel system 11. A first common rail 13 and a second common rail 14 are fluidly connected to fuel injectors 20 with the plurality of quill assemblies 30. Each matched inner and outer quill pair 40, 50 is retained together during pre-installation handling with a retainer 60 positioned between the inner and outer quills 40, 50. The retainers 60 are left in place between the respective inner and outer quills 40, 50 after the fluid connect step is completed by installing fuel system 11 in an engine 10.

By preassembling matched pairs of inner and outer quills 40, 50, the assembly of the fuel system 11 to engine 10 can be simplified and streamlined by avoiding specific adjustment features, while still ensuring that each quill 40, 50 sealingly engages the common conical seat 23 of a fuel injector 20. By having specific matched dimensional pairs, any pair should properly be installable and inter-changeable with any of the engine cylinders 12 of engine 10 despite the fact that one could expect at least one outer quill 50 of at least one quill assembly 30 to not match at least one inner quill 40 of another quill assembly 30.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A coaxial quill assembly comprising:

an outer quill with a first dimension along a centerline;

an inner quill positioned inside the outer quill and having a second dimension along the centerline;

the outer quill and the inner quill being a matched pair such that the first dimension and the second dimension have a difference corresponding to a fuel system dimensional specification;

the inner quill defining a first fuel passage;

a second fuel passage defined by and between the inner quill and the outer quill;

a retainer positioned in, but not obstructing, the second fuel passage in frictional contact with an interior surface of the outer quill and an exterior surface of the inner quill; and wherein the retainer permits relative movement of the outer quill relative to the inner quill along the centerline with an application of an adjustment force, but resists separation of the outer quill from the inner quill absent a forced disassembly.

2. The quill assembly of claim 1 wherein the difference includes a distance along the centerline between a first gage line of the outer quill and a second gage line of the inner quill.

3. The quill assembly of claim 2 wherein the outer quill has a spherically shaped end that includes the first gage line; and the inner quill has a spherically shaped end that includes the second gage line.

4. The quill assembly of claim 1 wherein the first dimension is less than a length of the outer quill along the centerline; and the second dimension is less than a length of the inner quill along the centerline.

5. The quill assembly of claim 4 wherein the inner quill has spherically shaped ends that define an inlet and an outlet, respectively, to the first fuel passage; and the outer quill has a spherically shaped end that defines an outlet from the second fuel passage.

6. The quill assembly of claim 1 wherein the retainer is a piece of spring steel that is elastically deformed to be positioned between the inner quill and the outer quill.

7. The quill assembly of claim 5 wherein the piece of spring steel defines an open shape around the centerline.

8. A dual fuel common rail fuel system comprising:

a first common rail;

a second common rail;

a plurality of fuel injectors that each define a first fuel inlet and a second fuel inlet that open through a common conical seat;

a plurality of quill assemblies that each defines first and second fuel passages that fluidly connect the first common rail and the second common rail, respectively, to an individual one of the plurality of fuel injectors;

each of the quill assemblies includes matched inner and outer quills that are out of contact with each other but retained together during pre-installation handling by a retainer positioned in the second fuel passage; the match being based on a first dimension of the outer quill and a second dimension of the inner quill having a difference corresponding to a fuel system dimensional specification that causes both the inner and outer quills to sealingly engage the common conical seat; and wherein the retainer resists separation of the outer quill from the inner quill absent a forced disassembly during pre-installation handling, but is inert to operation of the fuel system.

9. The dual fuel common rail system of claim 8 wherein the inner and outer of quills have spherical ends that contact the common conical seat at gage lines separated by the difference.

10. The dual fuel common rail system of claim 9 wherein the inner quill has another spherical end that defines an inlet to the first fuel passage.

11. The dual fuel common rail system of claim 10 wherein the first common rail contains liquid fuel and the second common rail contains gaseous fuel; and a gaseous fuel inlet and a liquid fuel inlet of each fuel injector open at different locations through the common conical seat.

12. The dual fuel common rail system of claim 11 wherein an outer quill of at least one quill assembly is not a match for an inner quill of at least one other quill assembly.

13. The dual fuel common rail system of claim 12 wherein the retainers of each of the quill assemblies is an identical piece elastically deformed between the inner quill and the outer quill.

14. The dual fuel common rail system of claim 13 wherein the identical piece is spring steel that defines an open shape around the centerline.

15. A method of assembling a fuel system comprising the steps of:

pre-assembling a plurality of quill assemblies;

fluidly connecting a first common rail and a second common rail to a plurality of fuel injectors with the plurality of quill assemblies;

the pre-assembling step includes matching an inner quill and an outer quill for each of the quill assemblies based on a first dimension of the outer quill and a second dimension of the inner quill having a difference corresponding to a fuel system dimensional specification that causes both the inner and outer quills to sealingly engage a common conical seat of one of the fuel injectors;

retaining a matched inner and outer quills together during pre-installation handling with a retainer positioned between the inner and outer quills; and leaving the retainers in place between the respective inner and outer quills after the fluid connecting step.

16. The method of claim 15 wherein an outer quill of at least one quill assembly is not a match for an inner quill of at least one other quill assembly.

17. The method of claim 16 including supplying liquid fuel and gaseous fuel from the first and second common rails, respectively.

* * * * *